United States Patent [19]

Crozier

[11] Patent Number: 5,701,423
[45] Date of Patent: Dec. 23, 1997

[54] METHOD FOR MAPPING, TRANSLATING, AND DYNAMICALLY RECONCILING DATA BETWEEN DISPARATE COMPUTER PLATFORMS

[75] Inventor: Keith Crozier, Acton, Mass.

[73] Assignee: Puma Technology, Inc., San Jose, Calif.

[21] Appl. No.: 224,329

[22] Filed: Apr. 7, 1994

Related U.S. Application Data

[62] Division of Ser. No. 867,167, Apr. 10, 1992, Pat. No. 5,392,390.

[51] Int. Cl.⁶ .................................................. G06F 17/30
[52] U.S. Cl. ...................... 395/335; 395/222; 395/228; 395/613; 395/200.01; 395/766
[58] Field of Search .......................... 395/600, 161, 395/159, 500, 650, 200, 611, 612, 613, 335, 766, 228–242, 200.01, 200.19, 200.16; 364/DIG. 1

[56] References Cited

U.S. PATENT DOCUMENTS

| | | | |
|---|---|---|---|
| 4,432,057 | 2/1984 | Daniell et al. | 395/608 |
| 4,807,182 | 2/1989 | Queen | 395/144 |
| 4,866,611 | 9/1989 | Cree et al. | 395/600 |
| 4,875,159 | 10/1989 | Cary et al. | 395/619 |
| 4,956,809 | 9/1990 | George et al. | 395/601 |
| 5,065,360 | 11/1991 | Kelly | 395/800 |
| 5,142,619 | 8/1992 | Webster, III | 395/161 |
| 5,187,787 | 2/1993 | Skeen et al. | 395/600 |
| 5,210,868 | 5/1993 | Shimada et al. | 395/615 |
| 5,237,678 | 8/1993 | Kuechler et al. | 395/600 |
| 5,251,291 | 10/1993 | Malcolm | 395/161 |
| 5,261,045 | 11/1993 | Scully et al. | 395/161 |
| 5,261,094 | 11/1993 | Everson et al. | 395/617 |
| 5,272,628 | 12/1993 | Koss | 364/419.19 |
| 5,283,887 | 2/1994 | Zachery | 395/500 |

(List continued on next page.)

OTHER PUBLICATIONS

"FRX Extends Reporting Power of Platinum Series: (IBM Desktop Software's Line of Accounting Software)", Doug Dayton, PC Week, v8, n5, p29(2) Feb. 4, 1991.

(List continued on next page.)

*Primary Examiner*—Wayne Amsbury
*Assistant Examiner*—Hosain T. Alam
*Attorney, Agent, or Firm*—Fish & Richardson P.C.

[57] ABSTRACT

Traditionally, it has been difficult to share data among diverse computer applications and platforms because of underlying differences in data formats. Although the meaning or purpose of the data may be similar or identical (for example, two appointments entered using separate computer applications), the differences in data formats required by the various computer applications and platforms renders such sharing difficult. A method is disclosed for the translation of dissimilarly-formatted data between disparate computer applications and platforms. The method also provides for the dynamic reconciliation of conflicts in the data (for example, two appointments scheduled at the same time) based on both the content of the data and on specific preferences indicated by the user of the translation facility. First, the data is translated to a common format based on the user-specified mapping of data fields (identifying handheld and desktop fields to be translated) and considering the characteristics of the handheld or desktop computer application. Then, if the specific data item (such as an appointment, telephone book entry, or memo entry) already exists on the desktop computer application or platform, the user is optionally notified of the conflict and given the opportunity to replace the existing data, ignore the incoming data, or modify the incoming data. The criteria for determining the existence of conflicts is disclosed for updating schedule information and keyed databases.

15 Claims, 8 Drawing Sheets

Microfiche Appendix Included
(4 Microfiche, 330 Pages)

U.S. PATENT DOCUMENTS

| | | | |
|---|---|---|---|
| 5,301,313 | 4/1994 | Terada et al. | 395/600 |
| 5,315,709 | 5/1994 | Alston, Jr. et al. | 395/606 |
| 5,327,555 | 7/1994 | Anderson | 395/617 |
| 5,333,252 | 7/1994 | Brewer, III et al. | 395/767 |
| 5,339,392 | 8/1994 | Risberg et al. | 395/161 |
| 5,339,434 | 8/1994 | Rusis | 395/700 |
| 5,392,390 | 2/1995 | Crozier | 395/335 |
| 5,434,994 | 7/1995 | Shaheen et al. | 395/617 |
| 5,475,833 | 12/1995 | Dauerer et al. | 395/617 |
| 5,519,606 | 5/1996 | Frid-Nielsen et al. | 395/228 |

OTHER PUBLICATIONS

"The Big Picture (Accessing Information on Remote Data Management System", UNIX Review, v7, n8, p38(7): Aug., 1989.

"Logical Connectivity: Applications, Requirements, Architecture, and Research Agenda", Stuart Madnick & Y. Richrad Wang, MIT, System Sciences, 1991 Hawaii Int'l, vol.1, IEEE, Jun. 1991.

Alfieri, "The Best of WordPerfect Version 5.0," Hayden Books, pp. 153–165, 429–435 (1988).

"Automatically Synchronized Objects," Research Disclosure #29261, p. 614 (Aug. 1988).

Cobb et al., "Paradox 3.5 Handbook 3rd Edition," Bantam, pp. 803–816 (1991).

IntelliLink Brochure (1990).

"Open Network Computing—Technical Overview," Sun Technical Report, Microsystems, Inc., pp. 1–32 (1987).

Organizer Link II Operation Manual, Sharp Electronics Corporation.

User Manual for Connectivity Pack for the HP 95LX, Hewlett Packard Company (1991).

User Manual for PC–Link for the B.O.S.S. and the PC–Link for the B.O.S.S., Traveling Software, Inc. (1989).

Zahn et al., *Network Computing Architecture*, pp. 1–11; 19–31; 87–115;117–133; 187–199; 201–209 (1990).

SCHEDULE MAP TABLE 601

| DATE | START | END | ALARM | DESCRIPTION |
|---|---|---|---|---|
| 12121991 | 1000 | 1100 | 0945 | MEETING-HELEN |
| 12151991 | 1100 | 1300 | 0 | LUNCH-JIM |
| 12161991 | 0800 | 1100 | 0745 | MEETING-TOM |
| 12161991 | 1000 | 1100 | 0 | PRESENTATION |
| 12171991 | 1400 | 1600 | 1345 | DENTIST |
| 12181991 | 0800 | 0900 | 0 | INTERVIEW MIKE |
| | | | | |
| 12211991 | 1300 | 1400 | 0 | LUNCH |
| 12251991 | 900 | 1700 | 0 | CHRISTMAS |

Field Mapping

| TEL HandHeld Fields: | PARADOX Field Mapping: | PARADOX Field Mapping: | |
|---|---|---|---|
| NAME | | CUSTNAME | OK |
| NUMBER | | CUSTNO | |
| ADDRESS_LINE 1 | | ITEM | Remove |
| ADDRESS_LINE 2 | | ORDDATE | |
| ADDRESS_LINE 3 | | PRICE | Add Field |
| ADDRESS_LINE 4 | | QTY | |
| ADDRESS_LINE 5 | | | New Field Name: |
| ADDRESS_LINE 6 | | | |
| ADDRESS_LINE 7 | | | |
| ADDRESS_LINE 8 | | | |

FIG 5A

Field Mapping

| TEL HandHeld Fields: | PARADOX Field Mapping: | PARADOX Field Mapping: | |
|---|---|---|---|
| NAME | | CUSTNAME | OK |
| NUMBER | | CUSTNO | |
| ADDRESS_LINE 1 | | ITEM | Remove |
| ADDRESS_LINE 2 | QTY | ORDDATE | |
| ADDRESS_LINE 3 | | PRICE | Add Field |
| ADDRESS_LINE 4 | | QTY | |
| ADDRESS_LINE 5 | | | New Field Name: |
| ADDRESS_LINE 6 | | | |
| ADDRESS_LINE 7 | | | |
| ADDRESS_LINE 8 | | | |

FIG 5B

Field Update

Key Field Name: Name
John Jones

Handheld Data
NUMBER_Line1

212-111-3333

PC Data
Business Phone
(212)111-2222

[Accept]  [Ignore]  [Cancel]

FIG 7

Schedule Update

Handheld Data
Announcement

Date: 02/26/92   Start Time: 09:30AM   End Time: 10:30AM

PC Data
Meeting with Jim

Date: 02/26/92   Start Time: 09:00AM   End Time: 10:00AM

[Accept]  [Ignore]  [Cancel]

FIG 8

MAPPING Database Fields

| Name | Data Format | Description |
|---|---|---|
| HH Type | A06 | Handheld make/model |
| HH Application | A15 | Handheld Application Name |
| DT Application | A25 | Desktop Application Name |
| DT File Name | A64 | Name of Desktop database file |
| HH File Name | A64 | Name of Handheld database file |
| Record Number | N | Unique record id |
| HH Field Name | A15 | Name of the Handheld field and subfield number |
| DT Field Name | A25 | Field Name within "DT File Name" |
| Multiple Field flag | T/F | Indicator that HH logical field has multiple physical fields |
| Number of HH Fields | N | Number of real Handheld Fields |
| Field Type | A04 | Field type of Desktop Field |
| Number of Keys | N | Number of fields in Desktop database key |

Data format codes:

| | | |
|---|---|---|
| Ann | A string of length nn | |
| N | An integer | |
| T/F | A boolean true/false value | |

FIG 9

MAPPING Database for FIG. 4

| HHType | HHApp | DTApp | ... | Recno | HHFldNam | DTFldNam | MultFld |
|---|---|---|---|---|---|---|---|
| Psion | DATA | Paradox | | 1 | FIELD1 | CUSTNAME | N |
| Psion | DATA | Paradox | | 2 | FIELD2 | CUSTNO | N |
| Psion | DATA | Paradox | | 3 | FIELD3L1 | ITEM | Y |
| Psion | DATA | Paradox | | 4 | FIELD3L2 | QTY | Y |
| Psion | DATA | Paradox | | 5 | FIELD3L3 | PRICE | Y |
| Psion | DATA | Paradox | | 6 | FIELD3L4 | ORDDATE | Y |

FIG 10

RECONCILLIATION OF HANDHELD DATA and DESKTOP DATABASE MANAGER TRANSLATION

Handheld Computer Data

| Rec# | FIELD1 | FIELD2 | FIELD3L1 | FIELD3L2 | FIELD3L3 | FIELD3L4 |
|---|---|---|---|---|---|---|
| 1 | Ajax | 201 | Fan | 10 | $100 | 2/3/92 |
| 2 | Brown | 306 | Heater | 2 | $125 | 2/9/92 |
| 3 | Dillard | 443 | Toaster | 5 | $75 | 2/12/92 |
| 4 | Sheraton | 617 | Phone | 100 | $5000 | 2/27/92 |
| 5 | Avis | 023 | Ashtray | 20 | $100 | 2/15/92 |

Desktop Computer Data

| Rec# | CUSTNAME | CUSTNO | ORDDATE | QTY | ITEM | PRICE |
|---|---|---|---|---|---|---|
| 1 | Ajax | 201 | 2/3/92 | 10 | Fan | $100 |
| 2 | Brown | 306 | 3/2/92 | 4 | Heater | $250 |
| 3 | Dillard | 443 | 2/12/92 | 5 | Toaster | $75 |
| 4 | Sheraton | 617 | 2/27/92 | 100 | Phone | $5000 |
| 5 | Avis | 023 | 3/10/92 | 80 | Ashtray | $400 |

FIG 11

METHOD FOR MAPPING, TRANSLATING, AND DYNAMICALLY RECONCILING DATA BETWEEN DISPARATE COMPUTER PLATFORMS

This is a divisional of application Ser. No. 07/867,167, filed Apr. 10, 1992, now U.S. Pat. No. 5,392,390.

REFERENCE TO MICROFICHE APPENDIX

A source code listing of the preferred embodiment of the invention is appended in the form of 328 pages recorded on microfiche.

A portion of the disclosure of this patent document contains material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

This invention relates to programs that share data across disparate computer applications and platforms, such as handheld computers and desktop computers.

Handheld computers typically weigh less than a pound and fit in a pocket. Handheld computers typically provide some combination of personal information management functions, database functions, word processing functions, and spreadsheet functions. Owing to the physical and memory size, and processing power limitations of the handheld computers, however, these applications are generally limited in functionality and differ in data content and usage from similar applications on desktop computers.

Many users of handheld computers also own a desktop computer used for applications that manage data similar to the data carried in the handheld computer. In such cases, the user normally would want the same data on the desktop computer as in the handheld computer. There are a number of programs that transfer data between handheld computers and desktop computers, but they all create desktop computer's data with no regard for prior contents. As a result, all updates that have been done to the desktop computer's data prior to the transfer are ignored.

Many desktop computer applications have their data stored in large, complex, proprietary formats. Data transfer to these applications usually cannot take place through file transfer, because the data comes from the handheld computer in a different format and usually is a subset of the data held on the desktop computer. In such cases, data can only be communicated to and from the desktop application by the use of a database manager or by use of dynamic inter-application communication techniques.

Many handheld and desktop programs work with database files. Database files have a file format, the set of rules by which data can be read from or written to the file. A database file is composed of records, some of which are data records with the data of interest to the application program and the user, and often some header records. Each data record is composed of fields, and each field has a name and a data format. Examples of data formats include 1-, 2-, and 4-byte integers, a 4-byte or 8-byte floating point number, or one or more ASCII text strings. In the case of multiple text strings in one field, the strings (or subfields) are separated by a special character such as tab or linefeed. Each data record of a file shares the same record structure: a record structure is described by the fields' names, data formats, and byte offsets in the record. The file format's rules include a description of the record structure of the constituent data records, the record structure for any header records and how these header records aid navigation to find specific data records and/or specific fields within those records, "hidden" key tags to help find a record, and any rules that application programs use to access a particular record and field.

Database files are managed by two broad classes of programs, database managers and other application programs. A database manager is a program for managing general databases, that is, database files whose record structure can be specified at creation time by the user. Database manager programs maintain data dictionary records as headers in the database file. These data dictionary records specify each field's name, start byte offset within the record, and data format. Examples of database manager programs include Paradox, dbase, and IBM Current.

Other database files are managed by special-purpose application programs. These programs work on databases of one specified record structure; this specification is embedded in the code of the program rather than in header records of the file. For instance, a telephone directory program may work on files with a 32-character name and a 10-character phone number. This record structure would have been encoded in a data structure declaration in the source of the program.

One or more of the fields of a database record structure are designated as the key, the "name" by which the record can be specified for reading or writing. Some database files, typically those for schedule application programs, have "range keys"—the key specifies start and end points in a 1-dimensional key space rather than a single point in the (possibly multi-dimensional) key space. Range keys may specify multiple intervals, for instance "9AM to 10AM every Monday until November 17." Where non-range keys must be unique—there cannot be two records with the same non-range key—range keys may overlap or even be exactly equal, though typically these are undesirable situations and should brought to the attention of the user.

Because handheld computers of the current generation are diskless, "files" in the classical sense do not exist on many of these handheld computers. Within this patent, the term file should be understood to include the memory-resident datasets of a handheld computer, and the serial bit stream format in which a handheld computer sends or receives data to/from another computer.

File copying and data conversion are long-standing problems in the art, and many solutions to different parts of the problem have been offered.

U.S. Pat. No. 4,966,809 describes a technique for sharing data among disparate platforms with differing data formats, but leaves unsolved the problems of sharing data among platforms that require different record structures or file formats (broader problems that include the data format problem as a constituent), and does not provide a method for a user of these disparate platforms to conveniently instruct his system about his environment so that the system will apply itself in that environment.

There are several file transfer programs for communicating between computers, including Organizer Link 2 from Sharp® Electronics, PC-Link for the Casio B.O.S.S.™ from Traveling Software®, HP95LX Connectivity Pack from Hewlett Packard, and 3 Link from Psion PLC. These file transfer programs do not provide the invention's user-specifiable field mapping of data nor dynamic reconciliation of data.

SUMMARY OF THE INVENTION

The current invention solves the problem of sharing data between disparate application programs by providing user-specifiable field mapping of data and dynamic reconciliation of conflicts.

In preferred embodiments, the invention features accepting data from a first computer application, and then mapping and translating the data to the formats expected by a second computer application. The user of the translation facility may explicitly specify the mapping of the data fields of the two applications' files. During the data transfer, the user may also choose to be informed of application-specific conflicts between data received from the first application and that already existing on the second platform. When a data conflict is encountered, the user may then opt to accept, ignore, or change the data before it is applied to the second application's files.

The invention can also be used to transfer, compare and reconcile data between any other pair of disparate platforms, even if the disparity is relatively minor, as for instance between a Paradox database manager and a dbase database manager running on the same IBM PC.

The invention provides an effective method of translating data between disparate computer platforms and a wide variety of applications, while ensuring that the data need only be entered once (and not duplicated).

The invention also ensures the integrity of the data imported to computer applications, through the process of conflict resolution (also known as data reconciliation).

In a first aspect, the invention features a method for an interactive user of a computer to dynamically reconcile the information of two database files. The method comprises the steps of choosing corresponding records from the two files, comparing the information of corresponding fields of these records, and allowing the user to decide how to change the data in one of the two files to bring them into agreement.

In preferred embodiments in which the records of the two files are named by range keys, as in an appointment schedule application, the method comprises determining if any schedule conflicts exist (either the time of an appointment has been changed in one of the two schedule databases, or there are two different appointments for conflicting times) and allowing the user to decide how to change the data in one of the two files to bring them into agreement.

The invention offers a solution to previously unsolved portions of the data translation problem, by providing means to translate data from one record structure to another.

In a second aspect, the invention features a method for translating computer data from a source record structure to a destination record structure. The invention offers translations that are new in the art, by translating between source and destination record structures that differ in field naming, field order, or one-to-many or many-to-one field correspondence. The method comprises the steps of establishing a mapping between the fields of the two record structures, and using that mapping to translate the data of a source file into the destination record structure.

The invention provides both a framework and a convenient user interface for tying together previous data translation techniques into a more broadly-applicable and easy-to-use system.

In a third aspect, the invention features a method for translating computer data from a source record structure to a different destination record structure. The method comprises the steps of first establishing a mapping between the fields of the two record structures by presenting the names of the fields of each of the record structures on a display, and allowing a user to specify the correspondence between pairs of fields. The actual translation of files then makes use of this mapping to translate the data of a file from the source record structure to the destination record structure.

Other features and advantages of the invention will be apparent from the following description of preferred embodiments, and from the claims.

BRIEF DESCRIPTION OF THE DRAWINGS

FIGS. 5A and 5B show a sample screen display which enables the user to specify the mapping or correspondence of field names between handheld and desktop applications and platforms.

FIG. 7 shows a sample screen display which notifies the user of conflicts between handheld and desktop data for reconciliation purposes.

FIG. 8 shows a sample screen display which notifies the user of conflicts between schedule data contained on the handheld and desktop applications and platforms.

FIG. 9 shows the field structure of the field mapping database.

FIG. 10 shows a sample field mapping database.

FIG. 11 shows an example of data translated between a handheld computer database and a desktop computer database.

DESCRIPTION OF THE PREFERRED EMBODIMENT(S)

The preferred embodiment comprises several large programs with a number of steps that run on the desktop computer, and a small file transfer program that runs as a slave on programmable handheld computers. The major steps of the main program are:

1. Mapping of fields from desktop data formats to handheld data formats if required
2. Transfer of data from handheld to desktop
3. Translation of data to desktop format
4. Dynamic reconciliation of conflicts The mapping step establishes correspondences between fields of pairs of files. On import, the transfer step brings the handheld data into the desktop computer. The translation step uses the rules provided by the mapping step to convert the handheld data in one format to desktop data in another format. The dynamic reconciliation step informs the user of conflicts in the data and allows him to make decisions about whether to accept the new data, ignore it, or change it. A menu driver is provided to select which handheld applications to translate to which desktop applications.

The preferred embodiment also provides the capability to export and translate data from the desktop computer to the handheld computer. In this case, the steps are:
1. Mapping of fields from desktop data formats to handheld data formats if required
2. Transfer of data from desktop to handheld
3. Translation of data to handheld format Again, the above steps are under the control of a menu driver.

The following detailed description focuses on the mapping, transfer, and translation between the handheld computer and the desktop computer as well as the dynamic reconciliation of the data during translation. The mapping, transfer, and translation of the data from the desktop computer and the handheld computer is essentially identical except that there is no reconciliation, because the desktop data replaces the handheld data in the preferred embodiment owing to built-in constraints in most handheld computers.

Figure 1:
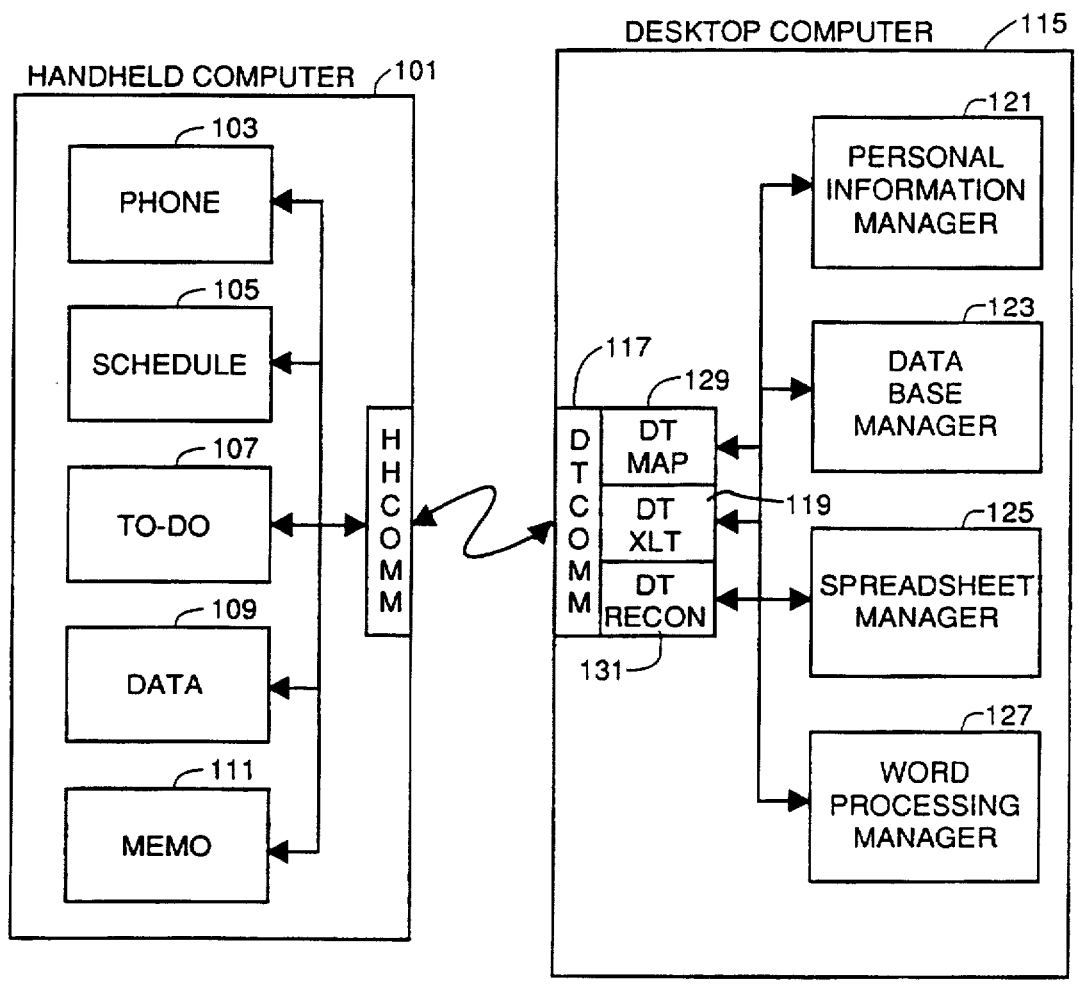
FIG. 1 is a block diagram of a preferred embodiment of the invention.

FIG. 1 shows a HANDHELD COMPUTER 101 with applications PHONE 103, SCHEDULE 105, TODO 107, DATA 109, and MEMO 111 transferring data to a desktop computer using file transfer application HHCOMM 113. HHCOMM 113 is responsible for accepting the data from the handheld computer and translating it to the COMMON RECORD STRUCTUREs, which are defined by the preferred embodiment. The COMMON RECORD STRUCTUREs are then passed to DESKTOP COMPUTER 115 by transfer application DTCOMM 117 which utilizes DTXLT 119 inter-application communications or database manager facilities as appropriate to translate the data to formats accepted by desktop applications PERSONAL INFORMATION MANAGER 121, DATABASE MANAGER 123, SPREADSHEET PROGRAM 125, or WORD PROCESSING PROGRAM 127.

Before communicating with the desktop application, the user may specify the mapping of handheld and desktop application data for the PHONE 103 and DATA 109 applications by utilizing the mapping facilities of DTMAP 129. A default mapping is provided for the other applications.

The user may optionally request from DTRECON 131 that conflicts between the handheld and desktop data be reconciled dynamically, thereby giving the user the option of accepting, ignoring, or changing any conflicting data.

The mapping step of the program builds a set of rules that the translate step will use to translate data from one record structure to another. The mapping step must be run once for each pair of source-destination file formats where one of the files is a keyed database, such as PHONE 103 or DATA 109. The output of a mapping step is a mapping database that can be used for any number of translate steps in the future.

There are two steps to the mapping process: (1) Acquiring the field names and data format of each field of each of the two record structures; and (2) establishing a correspondence between the fields of the source structure and the destination structure. Once a mapping between two record structures is established, it is maintained in a field mapping database for use by the translation steps.

There are three methods by which field names and data formats can be acquired, each method described in more detail in following paragraphs.

Some files, notably including files managed by database manager programs, have data dictionary records as headers in the database file. These data dictionary records provide exactly the information required. For example, the Paradox Engine data access facility provides all field names for a Paradox database upon request in the preferred embodiment.

In a second method, the application program provides this information to the mapping facility through an inter-application communication facility. An inter-application communication facility is provided by some application programs so that other programs may read and write data files maintained by the application. In addition to the normal program start entry point, the application program's image has other entry points that provide services like "Tell me the names of all fields in your records," "Give me the data format for the field whose name is BUSINESS PHONE", "Give me the next record key", "Give me the information of the CITY field for the record whose key is 'John Jones'." Windows Dynamic Data Exchange (DDE) is an example of this type of inter-application communication facility which is used by the preferred embodiment with desktop computer applications such as IBM Current and Polaris PackRat.

When neither of these two methods are available to the mapping facility for acquiring an understanding of the record structure, then in a third method, a description of the record structure (or the handheld's byte-stream format) is brute force hard-coded in a way that makes the information available to the mapping and translation facilities. In some cases, the developer of the application publishes the file format. For instance, for the HP95LX handheld computer SCHEDULE application, the byte stream representation of the file's record structure is:
Date 3 1-byte integers
Start Time 2-byte integer
End Time 2-byte integer
Alarm 1-byte integer
Description 27-byte ASCII string
Note 429-byte ASCII string The preferred embodiment provides hard-coded record descriptors for the PHONE 103, SCHEDULE 105, TODO 107, DATA 109, and MEMO 111 applications provided by each of the supported handheld computers. In some cases the field names are obtained from the actual field names in the handheld computer's implementation and used as the field names for the target application. An example of this would be the DATA application in the programmable Psion Series 3 handheld computer.

In a fourth method contemplated by the inventor but not implemented in the current embodiment, a data dictionary of the record structure can be coded into a text file, and the mapping step can read and interpret this text file much as it reads and interprets a database's data dictionary.

Once the mapping facility has acquired an understanding of the fields of each of the two record structures, the next step is to establish the actual field mappings - for instance, to establish a correspondence between a PHONE 103 field of file format 1 and a FAX NUMBER 307 field of file format 2, and to determine the data conversion rule for mapping a datum of field PHONE to a datum of field FAX NUMBER 307, for instance "convert 3 2-byte integers to 10 ASCII characters." This is accomplished by a user, who is presented with a list of all the fields of each of the two record structures, and then asked to select corresponding names.

Figure 2:
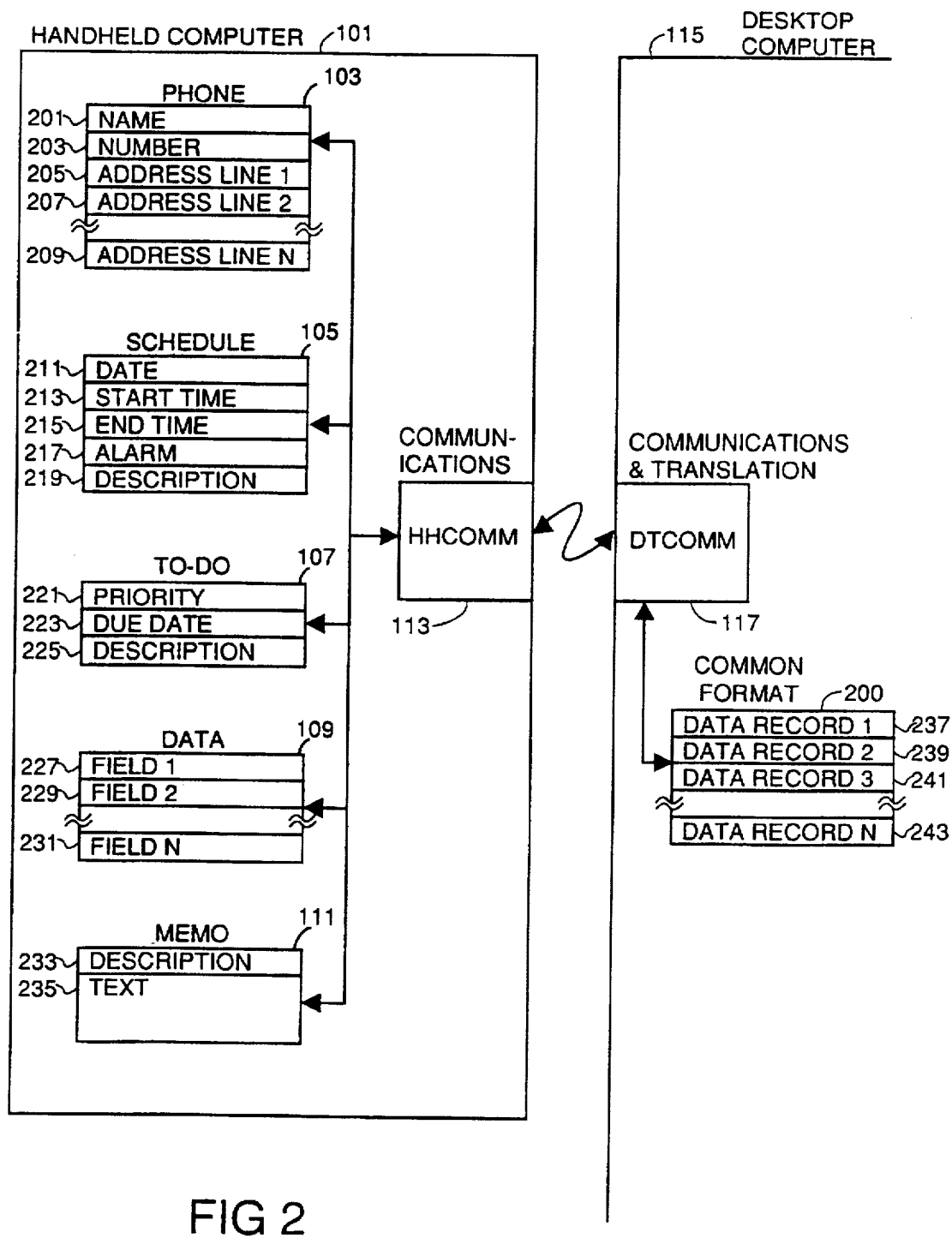
FIG. 2 shows examples of the transfer and translation of data from handheld applications and computers to common record structures.

It is sometimes preferable to not provide a mapping directly from the source application's file format to the destination application's file format, but to provide mappings from the source format to a COMMON RECORD STRUCTURE 200, and a mapping from the COMMON RECORD STRUCTURE 200 to the destination format. This case is most typical when one or both of the file formats are in the third brute-force category. The COMMON RECORD STRUCTURE 200 is typically chosen from one of the application programs' record structures. For instance, in the case of handheld computer PHONE 103 files, the program translates all PHONE 103 databases into the format used by the Sharp Wizard® handheld computer. The COMMON RECORD STRUCTUREs 300 are defined by the preferred embodiment for applications PHONE 103, SCHEDULE 105, TODO 107, DATA 109, and MEMO 111. These formats generally are determined by the hardware characteristics of the handheld computer. They are hard-coded into the preferred embodiment for each handheld computer. PHONE 103 and DATA 109 are similar and provide for a single-keyed indexed database with multiple subfields allowed in non-indexed fields. Examples of the COMMON RECORD STRUCTUREs 300 are shown in FIG. 2 for applications PHONE 103, SCHEDULE 105, TODO 107, DATA 109, and MEMO 111.

Figure 3:
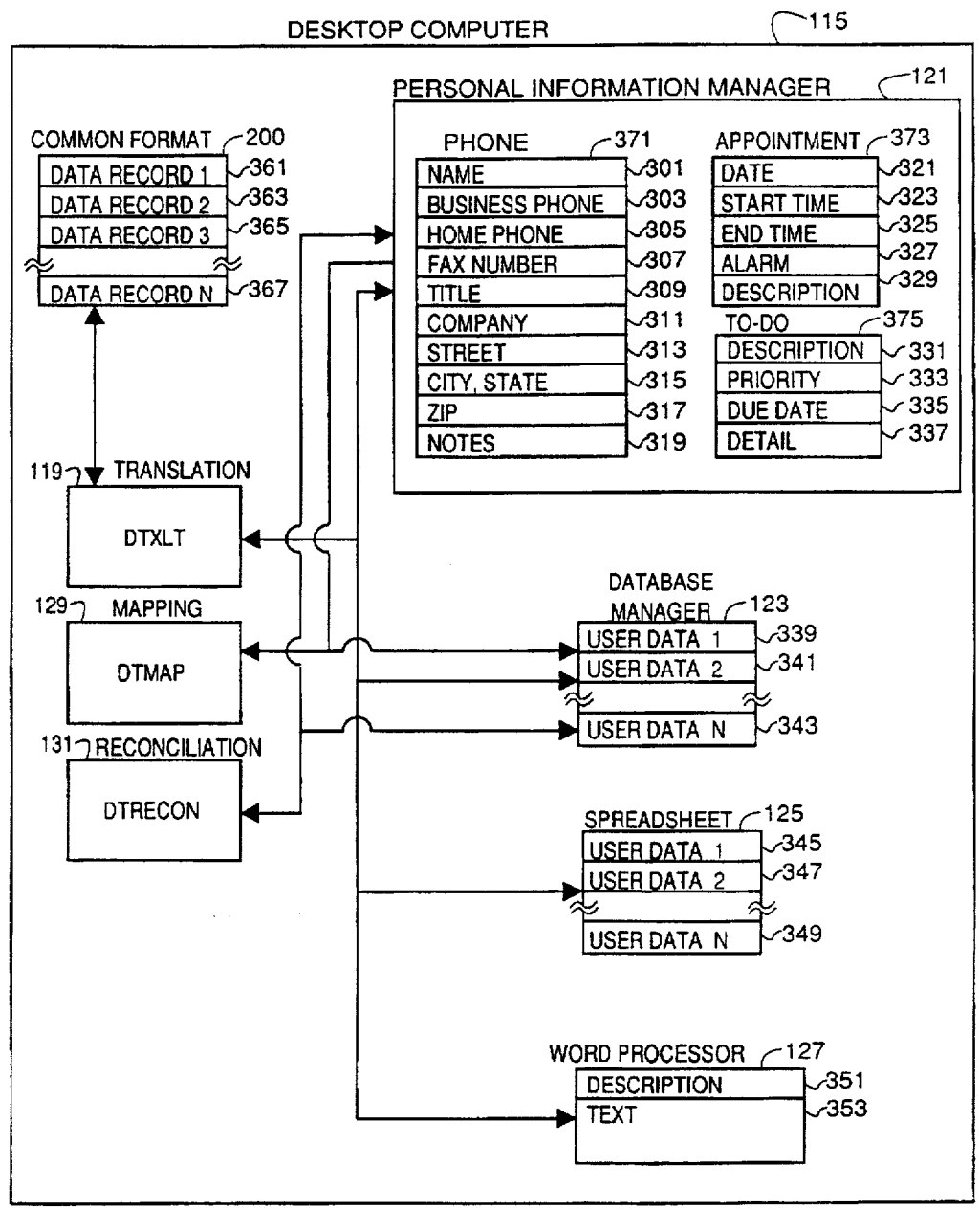
FIG. 3 shows examples of the transfer and translation of data from the common record structures to desktop applications and computers.

FIG. 3 shows an example of translation of data between the COMMON RECORD STRUCTURE 200, containing DATA RECORD1 361, DATA RECORD2 363, . . . DATA RECORDn 367 to various desktop applications such as a PERSONAL INFORMATION MANAGER 121 containing PERSON 371 data fields (NAME 301, BUSINESS PHONE 303, HOME PHONE 305, FAX NUMBER 307, TITLE 309, COMPANY 311, STREET 313, CITY, STATE 315, ZIP 317, and NOTES 319), APPOINTMENT 373 data fields (DATE 321, START TIME 323, END TIME 325, ALARM 327, and DESCRIPTION 329), and TODO 375 data fields (DESCRIPTION 331, PRIORITY 333, DUE DATE 335, and DETAIL 337).

FIG. 3 also shows the DTMAP 129 function which provides field mapping for a DATABASE MANAGER 123. The user of the preferred embodiment is allowed to specify the destination field that corresponds to each field in the handheld application database. As the translation takes place, the fields are mapped according to the user specification into the desktop application database.

Figures 4, 6:
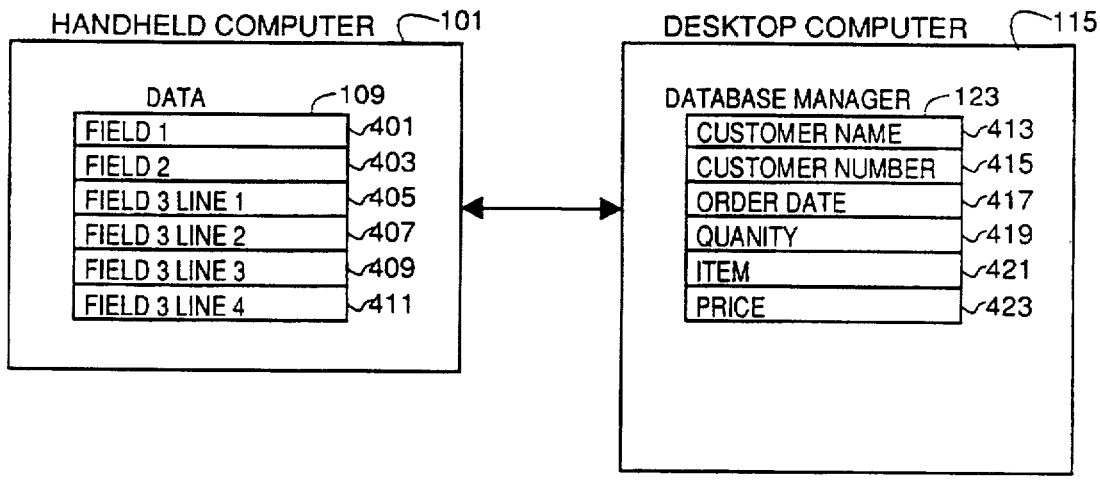
FIG. 4 shows an example of the detailed mapping of fields (specifying correspondence between handheld and desktop) between a handheld and desktop applications.
FIG. 6 shows an application-specific reconciliation table used internally by the translation software to achieve data reconciliation.

FIG. 4 shows an example of field mapping between an application's data 109 (FIELD1 401, FIELD2 403, FIELD3 405, FIELD4 407, FIELD5 409) of a HANDHELD COMPUTER 101, and a database manager application's data (CUSTOMER NAME 413, CUSTOMER NUMBER 415, ORDER DATE 417, QUANTITY 419, ITEM 421, and PRICE 423) of a DESKTOP COMPUTER 115.

FIG. 5 shows an example of the preferred embodiment's screen display which allows the user to specify field mapping. In this example, the translation is between a handheld computer's TEL database and the PARADOX database. In FIG. 5a, the user has selected a handheld field from the TEL column, such as ADDRESS LINE2, and a desktop field from the PARADOX column, in this case QTY. The selection is made by clicking a mouse (or trackball, or other pointer device) on the two respective field names. In FIG. 5b, the mapping between these two fields is completed, denoted by the field name from the desktop database displayed in the middle mapping column next to the field name from the handheld database. The mapping is stored in a MAPPING database, which is referenced during the translation operation.

The MAPPING database will be used during the translation process to determine where data from each field of the source application record is to be stored in the target application record. Each record of the MAPPING database describes all or part of the mapping of a single field of a handheld application's data file. In the case where a single field in the source database is to be mapped to multiple fields in the target database, multiple records will appear in the MAPPING database for that target field, with the "multiple field flag" set to TRUE. Because the mappings in the MAPPINGs database are bi-directional (i.e., the mappings are applicable both for handheld computer to desktop computer, and desktop computer to handheld computer), the appearance of multiple records in the MAPPING database with the "multiple field flag" can cause multiple fields from a source database to be combined in a single field in a target database. For instance, the example of FIG. 5 shows a case where one field in the handheld application (ADDRESS) can be mapped to eight fields in the desktop application by specifying mapping for ADDRESS_LINE1 through ADDRESS_LINE8.

FIG. 9 shows the fields for the MAPPING database. "HH Type" specifies the handheld make/model, such as the Sharp Wizard, HP95LX Palmtop Computer, the Casio B.O.S.S., and the Psion Series 3. "HH Application" specifies the handheld application name, such as PHONE, SCHEDULE, or MEMO. "DT Application" specifies the desktop application name, such as PackRat, or dBASE. "DT File Name" specifies the name of the desktop database file, such as C:\SK2\ADDRESS.DB for the Sidekick 2.0 PHONE/ADDRESS application. "HH File Name" specifies the name of handheld database file such as C:\_DAT_IL.PBK for the name of the file to be used by the PHONE application on the HP95LX. "Record Number" specifies the unique record id of the record in the MAPPING database which is required by the preferred embodiment for record uniqueness from a processing standpoint. "HH Field Name" specifies the name of the handheld field and subfield number for each mapping record, such as ADDRESS_LINE3. "DT Field Name" specifies the field name within "DT File Name" such as BUSINESS PHONE. "Multiple Field flag" is an indicator that "HH Field Name" is a member of a group of multiple fields to be mapped to/from a single physical field. "Number of HH Fields" specifies the number of real handheld fields in the handheld computer, which is information needed by the preferred embodiment (manually provided in the preferred embodiment). "Field Type" specifies the field type of "DT Field Name" such as A025 for ASCII, 25 bytes. "Number of Keys" specifies the number of fields in the desktop database manager's database.

The MAPPING database is created using an off-the-shelf database manager; in the preferred embodiment it is Paradox or C-Tree. At MAPPING database creation time, the above fields are defined. Each handheld application is introduced to the MAPPING database by manually entering the "HH Type" "HH Application" "DT Application" "Record Number" "HH Field Name" "Multiple Field flag" "Number of HH Fields" and "Number of Fields" fields "DT File Name" and "HH File Name" are created dynamically during mapping by the preferred embodiment. For some desktop applications, such as Polaris PackRat, the "DT Field Name" and "Field Type" are manually entered into the MAPPING database. For some other desktop applications such as Paradox, the Paradox Engine can be used to query a Paradox database to provide the "DT Field Name" and "Field Type".

Pseudocode for the specification of field mapping of data between the handheld computers and the desktop computer is shown in TABLE 1. The code implementing this is on pages 60–65 of the microfiche appendix.

TABLE 1

Pseudocode for Specification of Field Mapping of Data between Handheld and Desktop Applications

| | |
|---|---|
| 101 | Open MAPPING database |
| 102 | Display handheld field names |
| 103 | IF mapping previously specified |
| 104 | Display previous desktop field mappings |

TABLE 1-continued

Pseudocode for Specification of Field Mapping of Data between Handheld and Desktop Applications

| | |
|---|---|
| 105 | DO UNTIL user presses OK button |
| 106 | IF user specifies a handheld field to re-map |
| 107 | Display desktop fields which are eligible for mapping |
| 108 | Ask user for desktop field to map |
| 109 | Update desktop field table for specified handheld field |
| 110 | Display new desktop field mapping |
| 111 | END IF |
| 112 | IF user specifies Cancel |
| 113 | Exit |
| 114 | END DO UNTIL user presses OK button |
| 115 | Write new MAPPING database |

The preferred embodiment allows the use of one-to-many field mappings and many-to-one field mappings. One-to-many means that a single text field in the handheld application's data file can contain several pieces of data, delimited by special characters, which will be translated to multiple fields in the desktop applications data file. Many-to-one means that the reverse translation will take place.

The one-to-many and many-to-one relationships are accomplished in the preferred embodiment by specifying multiple mapping records in the MAPPING database for a single field in either the handheld computer or the desktop application. These records are marked specially as multiple-field-mappings for the translation process. Multiple-string fields are noted in the hard-coded description of the record structure (method 3). Future implementations will allow the user to specify that a field has multiple subfields on a point-and-click menu.

In the preferred embodiment, the user is presented with a screen as shown in FIG. 5 which displays the selections available for mapping. If the user wishes to establish mappings from the handheld ADDRESS 205-209 field in the PHONE 103 application to a desktop Paradox database with fields such as TITLE 309, COMPANY 311, STREET 313, CITY, STATE 315, and ZIP 317, he is presented with subfields ADDRESS_Line1 205, ADDRESS_Line2 207, . . ., ADDRESS_LineN 209 fields for mapping. He then selects the subfield of ADDRESS_Line1 205 by clicking on the ADDRESS_Line1 205 and selects the desktop target field TITLE 309. He then selects the subfield of ADDRESS_Line2 207 by clicking on the ADDRESS_Line2 207 and selects the desktop target field COMPANY 311. The process is repeated for each handheld subfield and desktop target field.

The above process results in six records in the MAPPING database; the first maps ADDRESS_Line1 205 to TITLE 309, ADDRESS_Line2 207 to COMPANY 311, ADDRESS_Line3 to STREET 313, ADDRESS_Line4 to CITY 315, ADDRESS_Line5 to STATE 315, and ADDRESS_Line6 to ZIP 317. Special coding in the preferred embodiment handles the CITY, STATE pairing. These records will be used by the translation process to map the six subfields in the ADDRESS field of each record from the handheld computer to the six desktop fields in each target record in the desktop computer.

The first step in the use of the mapping and translation facilities described is to copy data from a desktop computer to a handheld, or vice-versa.

FIG. 2 shows a handheld computer application HHCOMM 113 transferring PHONE 103 data fields (NAME 201, NUMBER 203, ADDRESS 205, etc.), SCHEDULE 105 data fields (DATE 211, START TIME 213, END TIME 215, ALARM 217, and DESCRIPTION 219), TODO 107 data fields (PRIORITY 221, DUE DATE 223, and DESCRIPTION 225), DATA 109 data fields (FIELD1 227, FIELD2 229, . . . FIELDn 231), and MEMO 111 data fields (DESCRIPTION 233 and TEXT 235) to desktop computer application DTCOMM 117, which reads and translates the handheld computer data to the COMMON RECORD STRUCTURE 200 containing DATA RECORD1 237, DATA RECORD2 239, . . . DATA RECORDn 243.

Once the mapping has been specified and the data transferred, the translation may take place. The translation process for PHONE 103 and DATA 109 handheld data to database manager databases is controlled by the MAPPING database. Each record represents a field or subfield of the handheld computer's data. The mapping is performed to fields in the desktop application's database based on the field names of the desktop's application.

The MAPPING database for the data in FIG. 4 would contain records as shown in FIG. 10. In this case, FIELD1 data from the handheld would be mapped to the CUSTNAME field of the desktop application, FIELD2 data from the handheld would be mapped to CUSTNO, FIELD3L1 data would be mapped to ITEM, FIELD3L2 data would be mapped to QTY, FIELD3L3 data would be mapped to PRICE, and FIELD3L4 data would be mapped to ORDDATE. In this mapping, FIELD3 of the handheld computer is a multiple-field mapping. FIELD3 has four subfields which are mapped to four fields in the desktop computer database.

Pseudocode for typical application-specific translation of keyed PHONE 103 or DATA 109 files between handheld applications and desktop applications is shown in TABLE 2. The code implementing this in the preferred embodiment is on pages 65-66, 102-106, 179-187, 203-206, and 237-246 of the microfiche appendix.

TABLE 2

Pseudocode for Translating PHONE 103 or DATA 109 files

| | |
|---|---|
| 101 | Read MAPPING database |
| 102 | Build mapping structure for translation |
| 103 | DO UNTIL last handheld input record has been read |
| 104 | Read handheld input record |
| 105 | DO FOR each handheld input field |
| 106 | Perform translations such as conversion form handheld computer binary format to 12-hour ASCII AM/PM format (specific to each handheld computer) |
| 107 | Build output field or multiple fields when there are multiple mapping records per field (one-to-many) |
| 108 | END DO FOR each input field |
| 109 | Write output record |
| 110 | END DO UNTIL all input data records have been read |

In Step 102 of TABLE 2, the mapping structure is an internal data structure presenting the information needed for translation from the MAPPING database, containing the name, format, mapping, and multiple-field-mapping characteristics of each field. The process of building these data structures is accomplished by reading the MAPPING database and storing its data in the structure for reference during the translation. The structure is an internal image of the MAPPING database built to facilitate processing in the preferred embodiment.

Step 105 through 108 iterates through records in the mapping structure. Step 105 is performed for each field of the handheld computer's data.

Each handheld computer has its own format for its application data files. The data translations of step 106 are hard-coded into the translation facility of the preferred embodiment for each pair of source and destination data formats, as discussed earlier for the HP95LX handheld computer. An example is the conversion of the three single-byte integer fields in the HP95LX date to an ASCII-formatted date of mm/dd/yyyy. The year byte in the HP95LX format is number of years since 1900, so 1900 must be added to the single-byte integer (which has a maximum value of 255). In these data format conversions, the source bits differ from the destination bits, but the information—the meaning of those bits in the context of the record structure rules—is the same.

Step 107 iterates through records in the mapping structure for fields in the handheld computer which have multiple-field-mapping characteristics. In this case, multiple mapping records will exist in the mapping structure (one for each subfield). If a field in the source file has been mapped to multiple fields in the destination, the splitting occurs by recognizing tabs as subfield separators in the first file. Conversely, if several fields in the source map to a single field in the destination, the strings of the source fields are catenated together into the destination field with tab separators.

The danger presented by the above-described transfer and translation facilities is the classic consistency problem. Once data has been copied to two separate computers, different—and inevitably conflicting—updates may be applied to the two separate copies of the data. The user will often update the schedule he carries in his handheld computer, and the user's secretary may make changes to the desktop computer's data while the user is away.

Dynamic reconciliation allows the user of the handheld computer to make changes to the handheld computer while away from the desktop computer and discover the effect of these changes when returning to the desktop computer. The dynamic reconciliation runs on the desktop computer during the translation process from the handheld computer to the desktop computer and usually includes mapping of files of different formats.

FIG. 3 also shows the DTRECON 131 (Desktop Reconciliation) function which provides optional dynamic reconciliation of application-specific conflicts between incoming (handheld) data and existing (desktop) data, with capabilities to accept, ignore, or change incoming data. If a record from the handheld computer has a key which matches a record in the desktop computer, each handheld field of the record is compared to each desktop field. If they are different, the user is queried for resolution.

FIG. 11 shows an example of data for a database manager's database in FIG. 4. In this case, when a translation takes place from the handheld computer database of user DATA 109 with fields FIELD1 401, FIELD2 403, FIELD3 405, FIELD4 407, and FIELD5 409 and a desktop computer application's data CUSTOMER NAME 413, CUSTOMER NUMBER 415, ORDER DATE 417, QUANTITY 419, ITEM 421, and PRICE 423 conflicts would result during the translation of handheld data records 2 and 5 because their FIELD3L2/QTY and FIELD3L3/PRICE fields are different for the same key (which is FIELD1/CUSTNAME). The user would be prompted to choose whether to accept the data from the handheld computer.

The preferred embodiment allows the user to be optionally notified during translation if any of the existing data in the desktop application are different from the data in the handheld application. FIG. 7 shows an example of the preferred embodiment's screen display which allows the user to decide what to do about conflicts. In this case, the key field is Name. If a record exists in the desktop application with the same Name, the data in each field in the desktop is compared with the data from the handheld. If the data in any given field is different, the user may accept the update to the field, ignore it, or edit part or all of the incoming data in the record and write it to the desktop application's file. Note that the final result may be to update some fields of the desktop record and not others.

An example of an application-specific technique is documented in TABLE 3 for the import of handheld computer DATA 109 to a desktop computer DATABASE MANAGER 123 which contains an earlier version of the data in the handheld computer. The preferred embodiment's code for this is on pages 110–111 and 246–248 of the microfiche appendix.

TABLE 3

| Pseudocode for Reconciliation of Data for DATA 109 Application (occurs for each record during Translation, Step 105–108 in TABLE 2) | |
|---|---|
| 101 | Query desktop application for existence of handheld record key in desktop database |
| 102 | IF there is a desktop record with the same key |
| 103 | DO UNTIL all fields in the handheld record are checked (based on mapping) BEGIN |
| 104 | IF the handheld and desktop fields are unequal |
| 105 | Ask user to pick the handheld field, the desktop field, or wishes to change the handheld data and use the changed data |
| 106 | IF user wishes to change the handheld data |
| 107 | Update handheld field with changes |
| 108 | ELSE IF user selects handheld data |
| 109 | Update desktop field with handheld data |
| 110 | END IF |
| 111 | END IF |
| 112 | END DO |
| 113 | ELSE |
| 114 | create a desktop record from the handheld data |
| 115 | END IF |

Step 101 utilizes either a database manager query or an inter-application communication facility to determine if there is a record in the target application with the same key.

Steps 102 and 103 may involve translating the information of both records into a common record structure dissimilar to the record structures of both files. This translation may involve data format conversion of the fields, but the information of the fields—the meaning of the fields as interpreted under the record structure rules—is preserved. In this case, steps 107 and 109 involve another translation of the information into the correct record structure for writing to the handheld or desktop.

The preferred embodiment also performs translation from the desktop computer to the handheld computer utilizing techniques similar to TABLE 2.

TABLE 2 describes the translation process for a keyed database. Some applications such as the SCHEDULE 105 application do not have unique keys and have special characteristics. In this case, a different translation process is required. For example, in the preferred embodiment a single input record can generate multiple output records, such as repeating appointments. A repeating appointment typically is daily, weekly, monthly, etc. until a specified date, and with a description, for instance, "Branch Office Meeting" every Monday at 10:30 for the next two years.

Pseudocode for typical translation of data between the handheld application and the desktop application for the SCHEDULE 105 application is shown in TABLE 4. The preferred embodiment's code implementing this is on pages 97–102, 174–179, and 232–237 of the microfiche appendix.

TABLE 4

Pseudocode for Translation of SCHEDULE 105 files

| | |
|---|---|
| 101 | Open handheld file obtained from handheld application |
| 102 | Establish communication with the desktop application utilizing inter-application communication or a database manager, as appropriate |
| 103 | DO UNTIL last handheld record has been processed |
| 104 | IF the handheld record is a repeating appointment |
| 105 | DO UNTIL all repeating appointments are created |
| 106 | Create desktop appointment record |
| 107 | END DO |
| 108 | END IF |
| 109 | Translate appointment data |
| 110 | IF the user requested notification of conflicts |
| 111 | Check SCHEDULE MAP TABLE 601 for conflict |
| 112 | IF conflict exists |
| 113 | Ask the user to accept/ignore/change record |
| 114 | END IF |
| 115 | END IF |
| 116 | END DO |

Some applications such as the SCHEDULE 105 application have (possibly non-unique) range keys, rather than the unique point keys assumed in the reconciliation process of TABLE 3. In this case, the preferred implementation utilizes a special technique which performs reconciliation based upon the date and time of appointments. This type of reconciliation is not field-by-field as in a keyed database; it is based on the entire information of the appointment record being evaluated and compared to the existing overall schedule on the desktop.

The technique requires a SCHEDULE MAP TABLE 601 which contains all existing appointments in the SCHEDULE 105 data. An example of data in the SCHEDULE MAP TABLE 601 is shown in FIG. 6 (DATE 211, START TIME 213, END TIME 215, ALARM 217, DESCRIPTION 219). This table is searched for each incoming appointment to determine if there is a conflict in scheduling between the incoming appointment and all existing appointments in the desktop schedule.

For example, if an appointment from the handheld computer had a DATE 211 of 12/15/1991, a START TIME 213 of 10:00AM, and an END TIME 215 of 11:30AM, the SCHEDULE MAP TABLE 601 would indicate to the preferred embodiment that there is a conflict with the second appointment in the SCHEDULE MAP TABLE 601 which shows an appointment on 12/15/1991 from 11:00AM to 1:00PM. All times are converted to a 24-hour format to ease comparison. If an appointment shows an identical DATE 211, START TIME 213, END TIME 215, and DESCRIPTION 219, there is no conflict and the incoming appointment is ignored.

The preferred embodiment of the SCHEDULE RECONCILIATION facility creates a SCHEDULE MAP TABLE 601 by requesting all appointments for today and the future from the desktop schedule application. For example, the preferred embodiment utilizes Windows 3.0's Dynamic Data Exchange facility to request all schedule items from the desktop personal information manager Polaris PackRat. This results in a complete evaluation of all existing appointments in the desktop schedule. The resultant data are then used to build the SCHEDULE MAP TABLE 601 in the memory of the desktop computer. The SCHEDULE MAP TABLE 601, an example of which is shown in FIG. 6, is used for comparison during the translation of schedule data from the handheld computer.

Another method of querying schedule information from a handheld computer involves running the schedule application as a slave of the schedule reconciliation program. The reconciliation program issues requests to the schedule application, and the schedule application presents the appointments one by one to the reconciliation program.

The SCHEDULE RECONCILIATION facility then requests each appointment from the handheld schedule application by whatever access method is provided by the handheld application, and compares each appointment obtained from the handheld to the SCHEDULE MAP TABLE. If the handheld appointment is a repeating appointment, then it is expanded into multiple records, as far into the future as specified by the repeating appointment record. This can result in multiple records being produced in the destination file as the image of a single repeating appointment record in the source file.

Schedule conflicts (or, more generally, conflicts between two records with range keys) can be of two kinds: either an inexact overlap conflict, or a difference conflict. An inexact overlap conflict is when two range keys overlap, but are not exactly the same: for instance, an appointment in the handheld's schedule database overlaps an appointment in the desktop's schedule database, but one begins or ends earlier than the other. A difference conflict is detected when the two range keys are exactly the same—the appointments begin and end at the same time—but the text describing the appointment differs in the two databases. A third kind of discrepancy arises when a range key in one database has no overlapping range key in the other database—for instance, an appointment was added in one schedule database but not the other.

FIG. 8 shows an example of the preferred embodiment's screen display which allows the user to decide what to do about conflicts. In this case, the SCHEDULE MAP TABLE 601 has been searched to determine if there is an appointment during any of the time between 9:00AM and 10:00AM. There was an appointment named "Announcement" from 9:30AM until 10:30AM. The user may accept the new appointment, ignore it, or change the time or date of the incoming appointment and accept. If the data is changed, it will be re-checked for conflicts against the SCHEDULE MAP TABLE 601.

Pseudocode for typical application-specific reconciliation of data between the handheld computers and the desktop computer for the SCHEDULE 105 application is shown in TABLE 5. The preferred embodiment's implementation of this is on pages 101, 177–178, 235, and 284–288 of the microfiche appendix.

TABLE 5

Pseudocode for Reconciliation of Data for SCHEDULE 105 Application (Steps 106–117 of TABLE 5 occur for each record during Translation, Step 111–115 in TABLE 4)

| | |
|---|---|
| 101 | Establish communication with the desktop application |
| 102 | DO UNTIL last desktop Schedule has been queried |
| 103 | Read desktop schedule item |
| 104 | Add desktop schedule item to SCHEDULE MAP TABLE 601 |
| 105 | END DO |
| ... | for each iteration of TABLE 4, Step 111–115 |
| 106 | Look up handheld record's date and time range in SCHEDULE MAP TABLE 601 |
| 107 | IF an item exists with overlapping date and time |
| 108 | IF the description is different |
| 109 | Ask the user to select Accept Ignore, or Change |
| 110 | IF the user changes the handheld date or time |
| 111 | Restart DO UNTIL |

TABLE 5-continued

Pseudocode for Reconciliation of Data for SCHEDULE 105
Application (Steps 106–117 of TABLE 5 occur for each record
during Translation, Step 111–115 in TABLE 4)

| | |
|---|---|
| 112 | IF the user selects Accept |
| 113 | Add the item to the desktop |
| 114 | END IF |
| 115 | END IF |
| 116 | END IF |
| 117 | END IF |

TABLE 5 expands on the reconciliation section of TABLE 4, which describes the translation process for the SCHEDULE 105 application. First, the existing appointments in the desktop computer are requested from the desktop SCHEDULE 105 application. The SCHEDULE MAPTABLE 601 is built based on those appointments. This is done before any translation takes place. Then, each appointment from the handheld computer is evaluated based on DATE 211, START TIME 213, END TIME 215, and DESCRIPTION 219 to determine if any overlapping time exists. If there is any overlap and the DATE 211, START TIME 213, END TIME 215, and DESCRIPTION 219s are not exactly equal, the user is queried for resolution.

The resultant appointments are stored on the desktop via either a database manager or inter-application communication facility.

The discussion of the preferred embodiment concentrated on the mapping, transfer and reconciliation of data from a handheld computer to a desktop. The same techniques can be applied to map, transfer and reconcile data from a desktop to a handheld, between two desktop computers, or between handheld computers, or between applications on the same computer.

Because each model of handheld computer is slightly different in the way it communicates with a desktop, the preferred embodiment includes a small commmunciations component, 113 of FIG. 1, that must be customized to each handheld computer. Directions for using the preferred embodiment with each handheld computer differs; two editions of the owner's manual, for the Sharp Wizard® and the Hewlett-Packard HP95-LX, are attached as appendices one and two.

Many other embodiments of the invention are within the following claims.

What is claimed is:

1. A computer implemented method for translating computer data from a source record structure, in which information in a source file is arranged, to a destination record structure different from said source record structure, each of said source and destination record structures comprising a plurality of fields, each having a name, the method comprising
   (a) presenting the names of the fields of each of said source and destination record structures on a display
   (b) allowing a user to interactively select a field from said source record structure and a corresponding field from said destination record structure, thereby establishing a mapping between said fields, and
   (c) translating the information of the source file, which is arranged in said source record structure, into a form compatible with said destination record structure in accordance with said mapping,
   wherein said destination record structure differs from said source record structure in at least one of the following ways:
   (a) field name, or
   (b) field order, or
   (c) one-to-many or many-to-one field correspondence, wherein said source file exists on a first computer and said destination record structure is specified by a program for execution on a second computer.

2. The method of claim 1 wherein said selecting comprises said user clicking a pointer device on a displayed name of a source field of said source record structure and clicking said pointer device on a displayed name of a destination field of said destination record structure, thereby establishing a mapping between said source field and said destination field.

3. The method of claim 2 wherein said mapping between said source field and said destination field is displayed on said display.

4. The method of claim 3 wherein said displaying of said mapping comprises displaying the name of said destination field adjacent to the name of said source field.

5. The method of claim 1 wherein said field names are acquired by a first program for said presenting by examining a second program, the second program comprising an application that operates on files having at least one of said source and destination record structures.

6. The method of claim 5 wherein said examination is performed by an inter-application communication facility.

7. The method of claim 1 wherein said field names are acquired by a program for said presenting by examining data dictionary records in a file.

8. The method of claim 1 wherein said field names are acquired by a program for said presenting from a description of one of said record structures which is hard-coded into the program for said presenting.

9. The method of claim 1 wherein said field names for said source and destination record structures are acquired by a program for said presenting by techniques chosen from the list comprising:
   (a) examining a program that operates on files having at least one of said source and destination record structures,
   (b) examining data dictionary records stored in a file, or
   (c) hard-coding a description of said record structure into a program for said establishing,
   the method further comprising determining, for each of said source and destination record structures, which of said techniques to use for said acquiring.

10. The method of claim 1, wherein said mapping comprises mapping a source field of said source record structure to a destination field of said destination record structure, said destination field being of a different data format from the data format of said source field, and wherein said translating comprises data format conversion.

11. The method of claim 1 wherein said mapping comprises mapping one field of said source record structure to more than one field of said destination record structure.

12. The method of claim 1 wherein said mapping comprises mapping more than one field of said source record structure to one field of said destination record structure.

13. The method of claim 1, wherein a destination file of said destination record structure exists, further comprising the steps of
   comparing the translated information of said source file to the information of said destination file.

14. The method of claim 13 further comprising
   establishing a correspondence between records of said source file and records of said destination file, said correspondence based on comparisons of keys of said records, performing said translating on the information of each said record of said source file, thereby producing a translated record, and allowing a user, immediately after each said comparison in which a difference is discovered, to interactively select either said translated record or the corresponding records of said destination file, or both, or neither, and writing said selected records to an output file.

15. The method of claim 1, wherein said translating proceeds in two phases, the first phase being a translation from said source record structure to a common intermediate record structure, and the second phase being a translation from said common intermediate record structure to said destination record structure.

* * * * *

UNITED STATES PATENT AND TRADEMARK OFFICE
CERTIFICATE OF CORRECTION

PATENT NO.   : 5,701,423

DATED        : December 23, 1997

INVENTOR(S)  : Keith Crozier

It is certified that error appears in the above-identified patent and that said Letters Patent is hereby corrected as shown below:

Cover page, [56] References Cited, OTHER PUBLICATIONS, first reference, "FRX" should be --FRx--.

Col. 7, line 46, "ADDRESSLINE2" should be --ADDRESS_LINE2--.

Col. 8, line 9, "ADDRESS_LINES" should be --ADDRESS_LINE8--.

Col. 8, line 46, after the third occurrence of "fields", insert --.--.

Col. 14, Table 5, at "109", after "Accept", insert --,--.

Col. 15, line 52, after "each", insert --field--.

Signed and Sealed this

Sixteenth Day of June, 1998

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,701,423
DATED : December 23, 1997
INVENTOR(S) : Keith Crozier

It is certified that error appears in the above-identified patent and that said Letters Patent is hereby corrected as shown below:

Column 2, line 51, "U.S. Pat. No. 4,966,809" should be --U.S. Pat. No. 4,956,809--.

Signed and Sealed this

Twenty-second Day of September, 1998

Attest:

BRUCE LEHMAN

Attesting Officer        Commissioner of Patents and Trademarks